(12) United States Patent (10) Patent No.: US 12,649,672 B2
Kondrutskii et al. (45) Date of Patent: Jun. 9, 2026

(54) METHOD OF PROCESSING HYDRO-MINERAL LITHIUM-CONTAINING FEEDSTOCK

(71) Applicant: Joint-Stock Company "Axion—Rare and Noble Metals", Perm (RU)

(72) Inventors: Dmitrii Alekseevich Kondrutskii, Perm (RU); Gadzhi Rabadanovich Gadzhiev, Volzhskiy (RU)

(73) Assignee: Joint-Stock Company "Axion—Rare and Noble Metals", Perm (RU)

( * ) Notice: Subject to any disclaimer, the term of this patent is extended or adjusted under 35 U.S.C. 154(b) by 489 days.

(21) Appl. No.: 18/276,422

(22) PCT Filed: Feb. 9, 2022

(86) PCT No.: PCT/RU2022/050040
§ 371 (c)(1),
(2) Date: Aug. 8, 2023

(87) PCT Pub. No.: WO2022/173331
PCT Pub. Date: Aug. 18, 2022

(65) Prior Publication Data
US 2024/0300830 A1 Sep. 12, 2024

(30) Foreign Application Priority Data
Feb. 9, 2021 (RU) ................................ 2021103059

(51) Int. Cl.
*C02F 1/28* (2023.01)
*C02F 101/10* (2006.01)
(Continued)

(52) U.S. Cl.
CPC ................ *C02F 1/281* (2013.01); *C22B 3/24* (2013.01); *C22B 26/12* (2013.01);
(Continued)

(58) Field of Classification Search
CPC ............................ C02F 1/281; C02F 2101/10; C02F 2301/046; C02F 2303/16; C22B 3/24;
(Continued)

(56) References Cited

FOREIGN PATENT DOCUMENTS

| | | |
|---|---|---|
| CN | 106745101 | 9/2018 |
| RU | 2012105842 | 8/2013 |

(Continued)

OTHER PUBLICATIONS

English machine translation of RU 2688593 C1 (Year: 2019).*

(Continued)

*Primary Examiner* — Anthony J Zimmer
*Assistant Examiner* — Abdul-Rahman Yusuf Waleed Smari
(74) *Attorney, Agent, or Firm* — Dentons US LLP

(57) ABSTRACT

The invention relates to hydrometallurgy of rare metals, in particular, to lithium sorption recovery from natural brines and wastewaters. The method comprises introducing a feed lithium-containing brine to a sorption-desorption concentrating module in a form of a vertical column filled with an inorganic sorbent being a chlorine-containing lithium aluminum double hydroxide. After sorption, the lithium saturated sorbent is washed with 27% ammonium chloride solution in the amount of 80-150% of the sorbent volume in the column and flowing through the column in the direction reverse to the direction of the feed brine flow. Then lithium desorption from the sorbent is performed with desalinated water to obtain a lithium enriched solution containing ammonium chloride impurities, which is then evaporated followed by ammonium chloride sublimation from the dry mixture. The effect of the invention is the reduced lithium losses with the washing solution and increased purity of the target product (LiCl concentrate).

3 Claims, 1 Drawing Sheet

(51) Int. Cl.
   C22B 3/24 (2006.01)
   C22B 26/12 (2006.01)
(52) U.S. Cl.
   CPC .... *C02F 2101/10* (2013.01); *C02F 2301/046* (2013.01); *C02F 2303/16* (2013.01)
(58) Field of Classification Search
   CPC ........... C22B 26/12; C22B 3/42; C22B 7/006; C01D 15/04
   See application file for complete search history.

(56) References Cited

FOREIGN PATENT DOCUMENTS

| RU | 2688593 | 5/2019 | |
| RU | 2659968 | 7/2023 | |
| WO | WO-2018190754 A2 * | 10/2018 | ............... C01F 5/24 |

OTHER PUBLICATIONS

Paranthaman et al., "Recovery of Lithium from Geothermal Brine with Lithium-Aluminum Layered Double Hydroxide Chloride Sorbents" Environ. Sci. Technol. 51, Oct. 2017, 13481-13486 (Year: 2017).*

Ryabtsev et al., "Interaction of Ammonium Bicarbonate with Lithium Chloride Solutions" Theoretical Foundations of Chemical Engineering 40, Dec. 2006, 649-654 (Year: 2006).*

International Search Report dated Jan. 24, 2023 for Application PCT/RU2022/050040 filed Feb. 9, 2021 (9 pages).

Meshram et al., Extraction of lithium from primary and secondary sources by pre-treatment, leaching and separation: A comprehensive review, Hydrometallurgy, vol. 150, 2014, pp. 192-208.

Xu et al., Materials for lithium recovery from salt lake brine, Journal of Material Science, 2021, vol. 56, pp. 16-63.

* cited by examiner

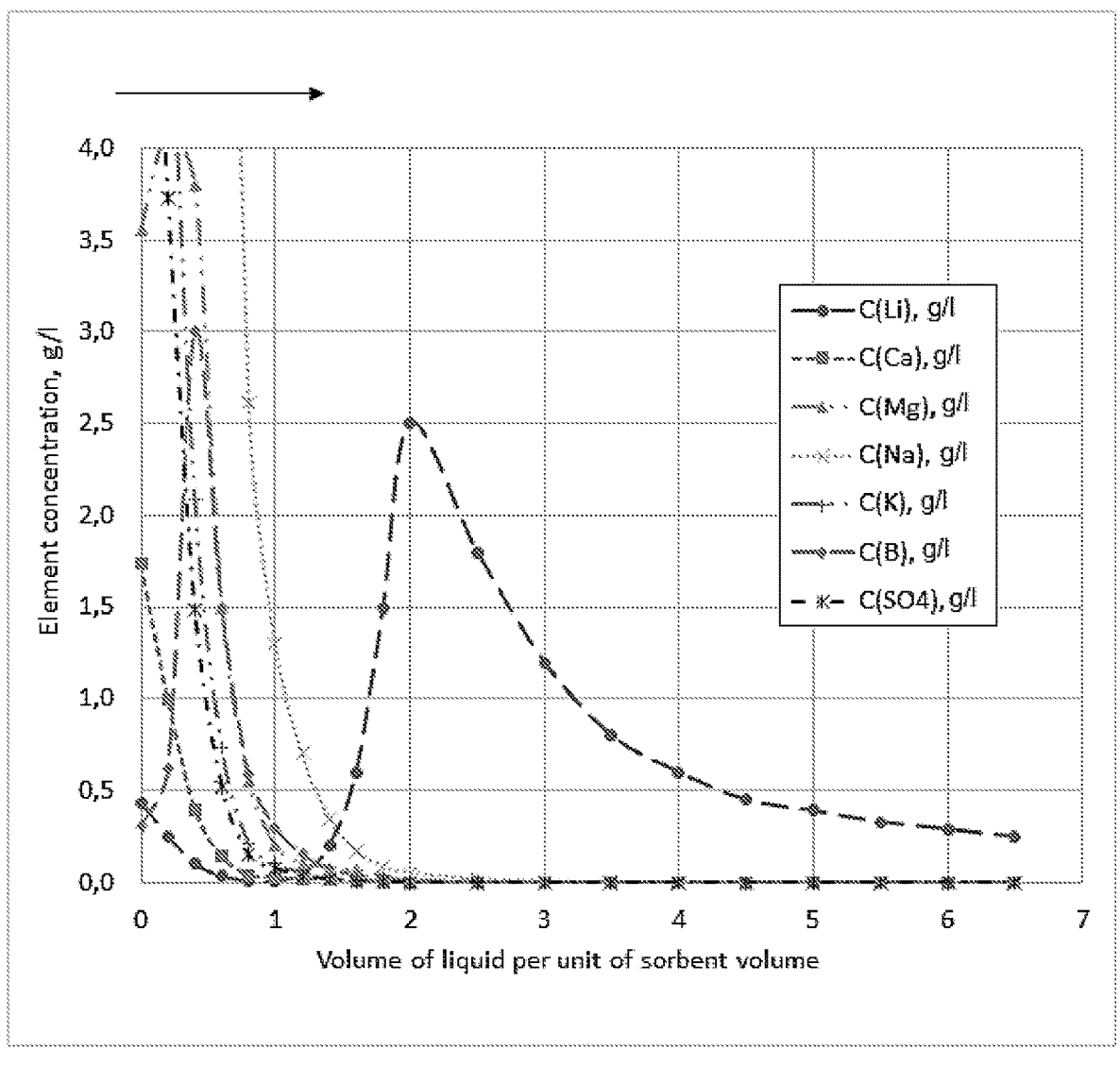

METHOD OF PROCESSING HYDRO-MINERAL LITHIUM-CONTAINING FEEDSTOCK

CROSS-REFERENCE TO RELATED PATENT APPLICATION

This patent application claims a benefit of priority to PCT International Application PCT/RU2022/050040 filed 9 Feb. 2022; which claims a benefit of Russian Application RU2021103059 filed 9 Feb. 2021; each of which is herein incorporated by reference in its entirety for all purposes.

The invention relates to the field of lithium hydrometallurgy and can be used to recover lithium from natural brines and waters, process solutions, and wastewaters of various production facilities.

Lithium-containing natural waters and brines is currently one of the types of feedstock used to produce lithium and its compounds. Since the concentrations of lithium ions in such feedstock are low in contrast to the significant concentrations of alkali and alkaline-earth ions and other associated components, applying a sorption technology with the use of sorbents selective to lithium is advantageous to recover lithium from the brines (see, for example, Ryabtsev A. D., Processing of lithium-bearing poly-component hydromineral feedstock based on its lithium concentration, abstract of a Ph.D. thesis for a degree in engineering science, Tomsk, 2011).

To recover lithium from the hydromineral feedstock, lithium aluminum double hydroxide chlorides are known to be used as selective inorganic absorbents. Efficient lithium absorption from the brines using the above absorbents and further lithium desorption to obtain the concentrate is confirmed in various information sources (see, for example, WO 2019221932, Nov. 21, 2019, US 20190256368, Aug. 22, 2019, CN 106140121, Nov. 23, 2016, RU 2659968, Jul. 4, 2018, RU 2720420, Jul. 29, 2020, RU 2713360, Feb. 4, 2020, etc.).

However, to obtain a high purity Li-concentrate, for example, suitable for the production of lithium batteries, the above methods require additional treatment stages, extra reagents, and/or use of additional equipment, which complicates the process. The production of high-quality lithium batteries is rather sensitive to boron content in the feedstock. The known absorption methods of producing Li-concentrates from the brines do not provide for the required degree of boron cleanliness for the resulting products.

There is a known method to produce lithium compounds from the feed chloride brines providing for a quite low boron concentration in the resulting product, and according to this method boron is extracted from the feed brine with an organic solution of $C_6$-$C_{16}$ fatty alcohols in kerosene at pH 1-2, then the boron-containing organic phase is separated, magnesium and calcium are removed from the aqueous phase, and lithium carbonate is precipitated (see U.S. Pat. No. 5,219,550, Jun. 15, 2010).

A disadvantage of this method is an additional stage of extraction using organic reagents and the need for significant brine acidification.

The closest method to the proposed technical solution is a method to process feedstock including sorption lithium recovery from the brines followed by lithium desorption with water.

The method according to RU 2688593 selected by the authors as a prototype includes feeding a lithium-containing brine into a vertically installed column filled with granulated inorganic sorbent being a chlorine-containing lithium aluminum double hydroxide, up to lithium saturation in the sorbent, then lithium desorption by feeding desalinated water into the column in the amount of 90-130% of the sorbent volume in the reverse direction to the feed lithium-containing brine to obtain a primary lithium concentrate (lithium chloride solution) with impurities of magnesium and calcium, then purification of the lithium concentrate from the impurities, and after washing recirculation of the brine to the feed lithium-containing brine flow entering the column for sorption.

A disadvantage of the method is a loss of up to 30% of sorbed lithium at the stage of washing the lithium-saturated sorbent with the demineralized water, the lost lithium is transferred to the aqueous washing solution when the salt concentration is lowered. These circumstances require recirculation of lithium and cause reduced sorbent capacity. Moreover, in the brines containing significant boron concentrations, boron is not fully removed from the sorbent by aqueous washing but is desorbed together with lithium contaminating lithium strippants.

The object of the present invention is to provide for an efficient method for processing a lithium-containing brine, the method allowing to decrease the volume of recirculated lithium with the washing solution, to increase the purity of the lithium concentrate, in particular, in terms of boron contaminants, and to reduce the number of process stages with possible further processing of the obtained eluate (the strippant) into commercial lithium-containing products.

This object is solved by the described method of processing hydromineral lithium-containing feedstock, the method comprising:

introducing a feed lithium-containing brine to a sorption-desorption concentrating module for obtaining a lithium saturated sorbent, wherein the sorption-desorption concentrating module is at least one vertically mounted column filled by inorganic granulated sorbent, wherein the inorganic granulated sorbent is a chlorine-containing lithium aluminum double hydroxide, washing the lithium saturated sorbent with a washing solution by its flowing through the column in the amount of 80-150% of the sorbent volume present in the column, in the reverse direction to the direction of the feed lithium-containing brine flow, desorption of lithium from the sorbent with desalinated water to obtain a lithium enriched solution.

In one embodiment, the method further comprising:

recirculating the solution obtained from the stage of washing the saturated sorbent in the column with the ammonium chloride solution by directing the solution to the feed lithium-containing brine flow.

In yet another embodiment, the method further comprising:

evaporating the lithium enriched solution obtained from the desorption stage and containing ammonium chloride impurities to obtain a dry mixture of lithium and ammonium chlorides, and thermal treatment of the obtained dry mixture of lithium and ammonium chlorides at 337-338° C. until ammonium chloride sublimation is completed.

The present inventors believe that the technical result is achieved by the above combination of inventive features due to the following reasons.

The present inventors have surprisingly found that the impurities of alkali and alkaline-earth metals are displaced from the sorbent inter-granular space and boron absorbed from the brine is desorbed, which occurs at the stage of washing the lithium saturated sorbent with the ammonium chloride saturated solution, that is fed to the sorbent in the amount of 80% to 150% of the sorbent volume in the column in the reverse direction to the direction of the feed lithium-containing brine flow. Due to the high chloride background concentration in the washing solution, lithium is not desorbed from the sorbent during washing (contrary to the washing with the demineralized water). Without limitation to any specific theory, the present inventors believe that the sorption/desorption mechanisms are different in the proposed and known methods due to the following reasons. Lithium cations are absorbed together with chloride anions and retained in the sorbent inter-granular space (chlorine-containing double aluminum and lithium hydroxide). Due to partial complex-formation with hydroxyl groups, boron is absorbed by the sorbent in the form of boric acid or borates together with lithium according to the inherent mechanism.

Upon washing the lithium saturated sorbent with the demineralized water in the prototype method, the salt background concentration is reduced and lithium chloride starts to transfer from the sorbent into the solution together with the impurities.

In the proposed method, upon washing the sorbent with the ammonium chloride saturated solution the overall salt background concentration is not reduced, and lithium is not washed off from the sorbent in the form of lithium chloride, wherein ammonium cations destruct complexes of boron with sorbent hydroxyl groups, which leads to boron removal from the lithium saturated sorbent.

Further lithium desorption from the sorbent preliminarily washed by ammonium chloride using the demineralized water allows producing a strippant, which comprises lithium chloride with ammonium chloride impurities, contrary to the strippant according to the prototype, which comprises impurities of alkali and alkaline-earth chlorides and boron.

FIG. 1 shows a dependency between ion concentration in the solution outgoing from the column and the joint volume of ammonium chloride solution run through the column during washing of the sorbent and the volume of the desalinated water used for lithium desorption from the sorbent.

The diagram shown in FIG. 1 demonstrates that the wash-off curves of boron, alkali, and alkaline-earth metals do not cross the lithium desorption curve, which proves that the purity of the lithium concentrate is increased as compared to the prototype method.

FIG. 1 also proves that the amount of the saturated ammonium chloride solution (80-150 vol. % of the sorbent volume) is significant since this is the range that ensures separation of wash-off curves of impurities and the target component (Li), i.e. purity of the target product (lithium concentrate) is increased with no losses of lithium.

According to the proposed method, the ammonium chloride impurities in the strippant are easily separated from lithium chloride by sublimation upon heat treatment of the dry residue obtained after the strippant drying. Ammonium chloride vapors can be sublimated and returned to the process, with almost pure lithium chloride left in the dry residue.

The proposed method can be implemented as follows.

The feed brine solution can be a natural brine (such as an oil field brine, a geothermal brine, salar brine, etc.), process solution or wastewaters from oil production, chemical or chemical-metallurgical production facilities, or a combination thereof. The feed brine is introduced to the sorption-desorption concentrating module comprising a vertical column or a system of columns connected in series under a revolver scheme, the column filled with granulated sorbent based on the chloride-containing type of aluminum-lithium double hydroxide. Lithium sorption from the feed brine is performed in the sorption-desorption module with a fixed sorbent bed by filtering the feed brine in the flow or in portions in the bottom-up filtering direction. When the sorbent in the column is saturated with lithium, filtering of the feed lithium-containing brine through the column is suspended and the flows through the column are switched under Marry-Go-Round (revolver) scheme for washing the granulated sorbent layer from the brine with the ammonium chloride saturated solution (27%) in the downward direction. The volume of the washing solution should be from 80% to 150% of the granulated sorbent volume used in the sorption-desorption concentrating module according to the required degree of washing from impurities and completeness of boron desorption. The displaced brine is directed to the feed lithium-containing brine flow entering to the sorption-desorption concentrating module for processing of the next portion of the feed lithium-containing chloride brine. Then lithium desorption is carried out by passing the desalinated water through the sorption-desorption concentrating module in the flow of in portions in the downward direction. The solution resulted from the desorption process is a lithium concentrate in a form of lithium chloride with impurities of ammonium chloride, almost free from impurities of alkali and alkaline-earth metals, sulfates, and boron.

If it is required to produce a dry product, lithium concentrate is evaporated to lithium chloride and ammonium chloride dry salts followed by ammonium chloride sublimation from the dry mixture at about 337.6° C. Lithium chloride produced in the dry residue can be used to obtain a commercial lithium-containing product such as lithium carbonate, fluoride, bromide, hydroxide, hydroxide monohydrate, etc., without additional purification.

EXAMPLE

Feed brine having the following ionic composition, g/l: lithium $Li^+$—0.437; sodium $Na^+$—114.55; potassium $K^+$—9.1; chloride $Cl^-$—196.0; magnesium $Mg^{2+}$—3.56; calcium $Ca^{2+}$—1.73; boron—0.312; sulfate ($SO_4^{2-}$)—6.51, is introduced in the bottom-up direction through the sorption-desorption concentrating module being a vertical column filled with the granulated sorbent without a binder-aluminum-lithium double hydroxide of the formula $LiCl*2.5Al(OH)_3$ with 50 wt. % of moisture. The sorbent volume in the column is 5 L. The sorbent is brought to saturation by monitoring the lithium concentration balance in the brine upstream and downstream of the column. After the lithium sorption stage is finalized, the sorbent in the column is washed by ammonium chloride saturated solution (27%) in the downward direction. Then the lithium desorption stage is carried out by flowing desalinated (demineralized) water through the sorbent column in the downward direction. The outgoing strippant is analyzed to determine concentrations of lithium, sodium, potassium, calcium, magnesium, boron, sulfate. The analysis results are shown in FIG. 1.

When the ammonium chloride saturated solution (27%) is passed through the sorption-desorption concentrating module in the amount from 4.0 to 7.5 L, which is from 80% to 150% of the used sorbent volume, most of the impurities of calcium (95.4 and 99.4%, respectively), magnesium (95.3 and 99.0%, respectively), sodium (97.4 and 99.6%, respectively), potassium (97.7 and 99.8%, respectively), boron (90.4 and 98.7%, respectively), sulfates (97.5 and 99.7%, respectively) comprised in the sorption-desorption concentrating module are washed off.

According to the graphs shown in FIG. 1, it can be concluded that the mechanical displacement of impurities with the residuals of the feed brine is not the only process taking place, but desorption of such sorbed impurities as boron and magnesium also occurs, where the impurities exit the sorption-desorption concentrating module with a clear concentration peak.

As compared to the prototype, the wash-off effect is high for calcium (up to 99.4%, against 98.8% in the prototype), magnesium (up to 99%, against 98.5% in the prototype), sodium (up to 99.6%, against 55% in the prototype), and boron that is prone to slow water desorption from the sorbents of this class contaminating lithium eluates, so the proposed purification method allows better wash-off of boron impurities as compared to the prototype (up to 98.7%).

The washing solution exiting the sorption-desorption concentrating module in the amount of 80-150% is directed to the feed lithium-containing brine flow entering the sorption-desorption concentrating module for processing the next portion of the feed lithium-containing chloride brine. Since the ammonium chloride does not cause lithium desorption, nor such negative consequences as sedimentation of calcium and magnesium salts, its presence in the feed brine causes no risk.

Directing the washing solution received from the sorbent wash-off into the flow of the next feed lithium-containing brine portion in the sorption-desorption concentrating module facilitates capturing lithium comprised in the washing solution after the sorbent washing at a concentration of 0.136-0.166 g/l by the sorbent, which prevents lithium losses during its recovery from the lithium-containing chloride brine. The volume of recirculated lithium is 3.5-5.7% of the sorbed amount (7-12% according to the prototype), which is at least twice as low as in the prototype.

Further desorption of the column of the sorption-desorption concentrating module with the demineralized water allows desorbing lithium chloride into the lithium concentrate. The obtained lithium concentrate after drying followed by thermal treatment at the sublimation temperature of ammonia chloride (337.6° C.), allows single stage obtaining lithium chloride having a minimal concentration of calcium impurities of 0.01-0.06%, magnesium impurities of 0.09-0.38%, sodium impurities of 0.32-2.15%, potassium impurities of 0.02-0.15%, boron impurities of 0.07-0.48%, sulfate impurities of 0.01-0.12%. According to the prototype, the concentration of impurities in the lithium concentrate is 18% for mere calcium and magnesium impurities, which does not allow obtaining pure lithium chloride without further purification.

It should be also noted that ammonium nitrogen being a part of mineral fertilizers and a vital component for plant growth can sometimes have a positive effect on the environmental situation and development of eco-systems located in places where lithium recovery technologies are used.

During the research, the present inventors tested various known sorbents based on chlorine-containing lithium aluminum double hydroxides. The studies showed that the technical result in the scope of the claimed combination of features was achieved with all types of sorbents of this class.

As it is demonstrated herein, the proposed method defined by the combination of features included in the claims provides for the claimed technical result and has the following advantages as compared to the prototype:

increased efficiency of lithium recovery from lithium-containing brines due to reducing the concentration of impurities in the strippant, in particular, boron;

preventing lithium losses with the flush waters;

increased effective operating capacity of the sorbent;

eliminating the discharge of acid and alkali solutions and solutions of additional reagents necessary according to the prototype method in the lithium chloride after-treatment to clean from calcium, magnesium, boron, and sodium impurities.

The invention claimed is:

1. A method of processing hydromineral lithium-containing feedstock, the method comprising:

introducing a feed lithium-containing brine to a sorption-desorption concentrating module for obtaining a lithium saturated sorbent, wherein the sorption-desorption concentrating module is at least one vertically mounted column filled with an inorganic granulated sorbent, wherein the inorganic granulated sorbent is a chlorine-containing lithium aluminum double hydroxide;

washing the lithium saturated sorbent with a solution flowing through the column in the direction reverse to the direction of the feed lithium-containing brine flow; and lithium desorption from the sorbent with desalinated water to obtain a lithium enriched solution;

wherein the lithium saturated sorbent is washed with 27% ammonium chloride saturated solution introduced in the column in the amount of 80-150% of the sorbent volume present in the column.

2. The method according to claim 1, wherein the solution obtained from the stage of washing the lithium saturated sorbent in the column with the ammonium chloride solution is recirculated by directing to the feed lithium-containing brine flow.

3. The method according to claim 2, the method further comprising:

evaporating the lithium enriched solution obtained from the desorption stage and containing ammonium chloride impurities to obtain a dry mixture of lithium and ammonium chlorides, and thermal treatment of the obtained dry mixture of lithium and ammonium chlorides at 337-338° C. until ammonium chloride sublimation is completed.

* * * * *